United States Patent Office 3,522,332
Patented July 28, 1970

3,522,332
**PROCESS FOR THE PREPARATION OF
1,2-POLYBUTADIENE**
Mitsuo Ichikawa, Yasumasa Takeuchi, and Akira Kogure, Yokkaichi-shi, Japan, assignors to Japan Synthetic Rubber Co., Ltd., Tokyo, Japan, a corporation of Japan
No Drawing. Filed May 29, 1968, Ser. No. 732,827
Claims priority, application Japan, June 2, 1967, 42/34,863
Int. Cl. C08d 3/06
U.S. Cl. 260—94.3          14 Claims

ABSTRACT OF THE DISCLOSURE

Process for preparation of polybutadiene having up to 99% of vinyl configuration by polymerizing butadiene in a halogenated hydrocarbon solvent with a catalyst prepared by mixing (A) a dialkyl aluminum chloride, (B) a cobalt compound, (C) an organic phosphine having not more than one aryl group, in the presence of water in an amount less than equimol to the dialkyl aluminum chloride.

---

The present invention relates to a process for the preparation of polybutadiene having a high percentage of vinyl configuration.

For preparing a so-called 1,2-polybutadiene, that is, a butadiene polymer having vinyl configuration in a very high percentage among the three configuration modes of cis-1,4 configuration, trans-1,4 configuration and vinyl configuration, there are known the following various processes:

(1) A process in which an organometallic compound of an alkali metal, such as, ethyl lithium and isoamyl lithium, is used as an initiator ("J. Polymer Sci."; part C, No. 4, 173 (1963) and "J. Polymer Sci. 61, 155 (1962)).

However, ionic catalysts, such as the above, have a reduced catalytic efficiency, as compared with the Ziegler-type catalyst described below. Also, since they tend to be influenced by impurities, particularly water, it is difficult in industrial practice to obtain a high molecular weight polymer and to control the molecular weight by using such a catalyst.

(2) A process in which there is used a so-called Ziegler type catalyst containing, as one component, a transition metal compound. Typical examples of such catalysts are as follows:

(i) V(ACAC)$_3$—AlR$_3$ (wherein R represents an alkyl group and ACAC represents an acetylacetonate group) ("Chim. e Ind."; 41, 526 (1959)).
(ii) Cr(ACAC)$_3$—AlR$_3$ ("Chim. e Ind."; 41, 1163 (1959)).

These catalysts are all heterogeneous and the products contain a large proportion of low molecular weight polymers soluble in ether and acetone. The products are syndiotactic or isotactic and are not rubbery. In particular, the 1,2-content in the products obtained by using any of these catalysts is less than 90% or usually about 80%.

Besides the aforesaid catalysts, there are also known the catalysts of Co$_2$(CO)$_8$—MoCl$_5$ ("Kogyo Kagaku Zasshi"; 67, 1652 (1964)) and MoCl$_5$—ZnR$_2$ (U.S.P. 3,232,920), but they are all heterogeneous and a large quantity of catalyst is required to obtain a significantly high catalytic activity. Also, in order to prepare a catalyst having a high catalytic activity, the catalyst must be aged under specific conditions.

In addition, Dr. E. Susa reported in ("J. Polymer Sci."; part C, No. 4, 399 (1963)) that a cobalt compound-trialkyl aluminum catalyst provided syndiotactic 1,2-polybutadiene but this report is clearly in error ("Ind. & Eng. Chem."; Product Research and Development, vol. 1, No. 1, page 32, March 1962), which was also confirmed by the inventors.

On the other hand, it has been well known that butadiene polymerizes in a hydrocarbon solvent such as benzene in the presence of a catalyst consisting of a combination of dialkylaluminum chloride and a cobalt compound to form a polymer having cis-1,4 configuration.

However, the inventors have found the surprising fact that if the above-mentioned catalytic system is combined with a specific organic phosphine and polymerization is carried out with such catalyst in a halogenated hydrocarbons solvent, then there will be obtained 1,2-polybutadiene. It has been further found that addition of small amounts of water to the catalyst produces higher molecular weight 1,2-polybutadiene. The present invention has been accomplished on the basis of this knowledge.

An object of the present invention is to provide an improved process for preparing polybutadiene having a high percentage of vinyl configuration.

Another object of the invention is to provide a process for preparing amorphous polybutadiene using a homogeous catalyst of high catalytic activity. Namely the present invention relates to a process for preparing 1,2-polyhalogenate dihydrocarbon solvent with a catalyst prepared by mixing.

(I) a dialkyl aluminum chloride represented by the general formula AlR$_2$Cl (wherein R represents an alkyl group);
(II) a cobalt compound; and
(III) an organic phosphine represented by the general formula PR'R"R''' (wherein R' and R" represent an alkyl group and R''' represents a member selected from the group consisting of alkyl groups and aryl groups) in the presence of water in an amount less than the equimolar amount to the dialkyl aluminum chloride.

One of the characteristics of the present invention is that polymerization is carried out in a halogenated hydrocarbon solvent. It is to be noted that if ordinary hydrocarbon solvents, such as, benzene, toluene and the like are used there is produced cis-1,4-polybutadiene. As far as the present invention is concerned, any kind of halogenated hydrocarbon may be used, provided that it remains liquid under the polymerization conditions and is inactive to the catalyst. However, methylene chloride, chloroform, ethyl chloride, trichlene, perchloroethylene, chlorobenzene, bromobenzene, chlorotoluene and the like are preferably used.

The first component of the catalyst used in the process of the present invention is absolutely required to be dialkyl aluminum chlorides expressed by the general formula AlR$_2$Cl. If AlR$_3$ is used in place of AlR$_2$Cl there will not be obtained any polymer. Where AlRCl$_2$ is employed, there is obtained a polybutadiene having a high percentage of trans-1,4 configuration. Also, use of Al$_2$R$_3$Cl$_3$ results in the production of a polybutadiene having mainly cis-1,4 configuration. While R of the general formula AlR$_2$Cl represents an alkyl group, it is preferably a straight or branched chain alkyl group having 1 to 8 carbon atoms such as methyl, ethyl, n-propyl, isopropyl, n-butyl, isobutyl, hexyl and octyl. Preferable dialkyl aluminum chlorides include dimethyl aluminum chloride, diethyl aluminum chloride, diisobutyl aluminm chloride, dihexyl aluminum chloride and dioctyl aluminum chloride.

The second component of the catalyst of the present invention consists of cobalt compounds. The cobalt compounds are not subject to any particular limitation. There may be used inorganic salts of cobalt such as cobalt chloride, cobalt bromide, cobalt iodide, cobalt nitrate, cobalt sulfate, cobalt sulfate, cobalt carbonate, cobalt cyanide, and cobalt thiocyanide, organic salts of cobalt such as cobalt octenoate, cobalt naphthenate and cobalt stearate or complex compounds of cobalt such as cobalt trisacetylacetonate, and cobalt bisacetylacetonate.

The third component of the catalyst of the invention consists of organic phosphines represented by the general formula PR′R″R‴ wherein R′ and R″ represent the same or different alkyl groups. These alkyl groups are preferably straight or branched chain alkyl groups having 1 to 8 carbon atoms such as methyl, ethyl, propyl, butyl, hexyl, and octyl. And R‴ denotes alkyl or aryl groups. The alkyl groups are preferably lower alkyl groups as in the case of R′ and R″, and the aryl groups are preferably phenyl and tolyl, particularly phenyl. Preferable organic phosphines include triethyl phosphine, tributyl phosphine, trioctyl phosphine, diethyl phenyl phosphine and dibutyl phenyl phosphine. The kinds or organic phosphines to be used are of significant importance for the process of the present invention. For instance, use of organic phosphines having not less than two aryl groups, for example, triphenyl phosphine and diphenyl ethyl phosphine results in the production of a polybutadiene having a high percentage of cis-1,4 configuration.

The catalyst of the present invention is prepared by mixing the afore-mentioned three components. Referring to the cobalt compounds, when cobalt halides, cobalt cyanides or cobalt thiocyanides are employed, these cobalt compounds and organic phosphines form complex compounds denoted by the general formula

$$CoX_2(PR′R″R‴)_2$$

(wherein X represents halogens, —CN or —SCN). Consequently there may be used these previously prepared complex compounds instead of using the cobalt compounds and organic phosphines separately. These complex compounds are particularly desirable, because their required amounts are reduced due to their good solubility in a polymerization solvent and there are obtained in the polymer product larger proportions of 1,2-configuration. Examples of preferable complex compounds of the cobalt halides with the organic phosphines are cobalt chloride bistriethyl phosphine, cobalt bromide bistriethyl phosphine, cobalt iodide bistriethyl phosphine, cobalt bromide bistributyl phosphine, cobalt chloride bisdiethyl phenyl phosphiline, coalt bromide bisdiethyl phenyl phosphine, cobalt iodide bisdiethyl phenyl phosphine and cobalt bromide bisdibutyl phenyl phosphine. With respect to cobalt cyanides and cobalt thiocyanides, the similar complex compounds with the organic phosphines are preferably used.

The catalyst of the present invention may be prepared by mixing the aforesaid catalyst components in a desired order in a halogenated hydrocarbon solvent. The catalyst may be prepared by mixing the components before being contacted with butadiene or may be prepared by mixing the components in a reaction vessel in the presence of a part or whole of butadiene to be polymerized. There is no particular limit to the temperature for preparing the catalyst, but usually a range of 0° C. to 50° C. is preferred.

The proportions of the respective components of the catalyst may be suitably determined according to the kinds of components, the conditions of polymerization and the desired physical properties of the polymer to be produced. However, where the cobalt compounds are soluble, the molar ratio of Co/Al generally ranges between 1:50 and 1:5000, preferably between 1:100 and 1:2000. In the case of insoluble cobalt compounds, their required amounts are large and it is sometimes necessary to employ about equimol of such insoluble cobalt compounds to the aluminum compounds. However, the cobalt compound which, when used alone, is insoluble in the solvent, is considerably dissolved thereinto when used in combination with other components. Where the organic phosphines are used in the form of complex compounds with the cobalt compounds, they are employed at the proportion of 2 mols per one mol of the cobalt compounds, but generally the proportion of the organic phosphines is from 0.5 to 50 mols per one mol of the cobalt compounds.

The catalyst prepared as above is soluble in the solvent and no particular aging treatment is necessary in the preparation of the catalyst.

Furthermore, the polymerization rate in the process of this invention is larger than that in conventional methods.

For the process of the present invention, the amount of water present in the polymerization system is of vital importance. The amount of water affects the polymerization activity, the molecular weight of the polymer produced and the microstructure thereof. Speaking of the molecular weight of the polymer, in the substantially anhydrous state where the water content in the reaction system is less than 10 p.p.m., the polymer produced is a liquid, semisolid or solid polymer having a relatively low molecular weight. However, larger amount of water causes the molecular weight of the polymer gradually to increase. Where the amount of water rises beyond 1.5 mols per one mol of the dialkyl aluminum chloride, the molecular weight sharply drops. On the other hand, the polymerization activity remains almost unchanged until the amount of water reaches up to about 1 mol per one mole of the dialkyl aluminum chloride. If the water increases beyond this level, the polymerization activity gradually decreases.

Referring to the microstructure of the polymer, where the amount of water increases over 1 mol per one mol of the dialkyl aluminum halide, the vinyl configuration is sharply reduced with the resultant gradual increase of trans-1,4 configuration. Accordingly, the desirable amount of water to obtain a high molecular weight polymer having a high percentage of vinyl configuration ranges between about 0.1 and 0.7 mol, preferably between about 0.3 and 0.6 mol per one mol of the dialkyl aluminum chloride.

Polymerization reaction may be carried out either continuously or batchwise by contacting butadiene with the aforementioned catalyst in a halogenated hydrocarbon solvent. The reaction temperature ranges between about −30° and 100° C., preferably between −10° and 80° C. The reaction pressure is not subject to any particular limitation, but is sufficient if it maintains the reaction mixture is a liquid phase under the reaction conditions.

It is preferable to carry out the polymerization reaction and prepare the catalyst in an atmosphere of gases which are inert to the catalyst, such as nitrogen and argon. The required amount of the catalyst generally ranges from 0.5 to 500 millimols, preferably from 5 to 50 millimols based on the amount of the dialkyl aluminum chloride per 1 mol of butadiene.

When the polymerization reaction has proceeded to a predetermined extent, there is added a suitable polymerization terminating agent to the reaction mixture to stop reaction. As the terminating agent, there may be used a conventional short stop such as water, alcohols and organic acids. However, it is desirable to use compounds which are usually used as an antioxidant, such as phenyl-β-naphthylamine and 2,6-di-tert-butyl-p-cresol. If the reaction mixture is exposed to the air before the antioxidant is added, the polymer produced tends to be gelated into an insoluble polymer. The polymer produced is separated from the reaction mixture by a conventional means. Upon drying, there is obtained the desired 1,2-polybutadiene.

The 1,2-polybutadiene obtained by the process of the present invention usually contains more than 75 percent of 1,2-configuration, and depending on the conditions of polymerization, it may be possible to obtain polybutadienes containing more than 99 percent of 1,2-configuration. Such 1,2-polybutadiene is amorphous, and rubbery if it has a high molecular weight. This rubbery polybutadiene has low resilience, which is one of its characteristics. The existing butyl rubber is known to have low resilience. However, unlike the butyl rubber, the rubbery 1,2-polybutadiene of the present invention contains a large number of carbon-carbon double bonds, so that it is capable of being readily vulcanized. Moreover, the rubbery 1,2-polybutadiene is a useful rubber having a sufficient strength to be used for general purpose rubber. On the other hand, 1,2-polybutadiene of relatively low molecular weight is useful as raw material for adhesives, paints and the like.

There will now be concretely described the present invention by reference to the examples which follow. It will be understood, however, that they are offered only by way of illustration and are not intended to restrict the scope and breadth of the invention or limit the scope of the present claim. In the examples, the intrinsic viscosity $[\eta]$ of the polymer was measured in toluene at a temperature of 30° C. and the microstructure was determined by the infrared absorption spectrum.

EXAMPLES 1 AND 2 AND CONTROLS 1 TO 4

A thoroughly dried 100 ml. ampoule was purged with nitrogen several times. Thereto were added 38 ml. of dry methylene chloride and 0.1 mol of dry butadiene at 10° C. Next there were introduced 2.0 millimols of the alkyl aluminum compounds as shown in Table 1 below. While stirring, there was added 0.005 millimol of cobalt bromide bistriethyl phosphine and immediately the ampoule was sealed. All these operations were performed in an atmosphere of nitrogen gas.

The ampoule was immersed in a polymerization bath controlled at 10° C. While rotating the ampoule, reaction was conducted for a prescribed period of time. Then the ampoule was opened and the toluene solution of phenyl-$\beta$-naphthylamine was introduced to stop the reaction. Thereafter the reaction mixture was poured into excess amount of a methanol-hydrochloric acid solution containing phenyl-$\beta$-naphthylamine to decompose the catalyst and make it soluble and at the same time allow the polymer produced to precipitate. The precipitated polymer was separated, washed several times with methanol containing phenyl-$\beta$-naphthylamine and dried in vacuum at 40° C. overnight. The results are shown in Table 1 below.

TABLE 1

| | Alkyl aluminum compounds | Polymerization time, min. | Yield, g. | Microstructure, percent | | | $[\eta]$ |
|---|---|---|---|---|---|---|---|
| | | | | Cis-1,4 | Vinyl | Trans-1,4 | |
| Example 1 | Al($C_2H_5$)$_2$Cl | 60 | 4.2 | 1 | 99 | 0 | 0.18 |
| Example 2 | Al($C_2H_5$)$_2$Cl | 1,200 | 5.1 | 1 | 99 | 0 | 0.16 |
| Control 1 | Al($C_2H_5$)$_3$ | 1,440 | 0 | | | | |
| Control 2 | Al($C_2H_5$)Cl$_2$ | 60 | 4.4 | 0 | 35 | 65 | |
| Control 3 | Al($C_2H_5$)Cl$_2$ | 30 | 2.4 | 0 | 23 | 77 | |
| Control 4 | Al$_3$($C_2H_5$)$_3$Cl$_3$ | 10 | 0.7 | 91 | 6 | 3 | 6.07 |

As clearly seen from the comparison of the controls 1 to 4 and the Examples 1 and 2 of the present invention in Table 1, only dialkyl aluminum chloride among the alkyl aluminum compounds could produce 1,2-polybutadiene.

EXAMPLES 3 AND 4 AND CONTROLS 5 AND 6

Butadiene was polymerized with the same procedure as in Example 1 except that there were used different kinds of complex compounds of cobalt bromide with organic phosphines and polymerization time was changed. The results are shown in Table 2 below.

TABLE 2

| | Complex compounds of cobalt bromide with organic phosphines[5] | Polymerization time, hr. | Yield, g. | Microstructure, percent | | | $[\eta]$ |
|---|---|---|---|---|---|---|---|
| | | | | Cis-1,4 | Vinyl | Trans-1,4 | |
| Control 5 | CoBr$_2$(Ph$_3$P)$_3$ | 0.3 | 3.9 | 80 | 10 | 10 | 1.41 |
| Control 6 | CoBr$_2$(Ph$_3$EtP)$_2$ | 0.3 | 3.6 | 82 | 15 | 3 | 1.02 |
| Example 3 | CoBr$_2$(PhEt$_2$P)$_2$ | 2 | 2.8 | 18 | 81 | 1 | 0.57 |
| Example 4 | CoBr$_2$(Et$_3$P)$_2$ | 2 | 4.5 | 1 | 99 | 0 | 0.20 |

[5] Ph denotes phenyl and Et denotes ethyl.

As clearly seen from the comparison of the controls 5 and 6 and the Examples 3 and 4 of the present invention in Table 2, organic phosphines containing not less than two phenyl groups could not produce 1,2-polybutadiene.

EXAMPLES 5 and 6

Butadiene was polymerized with the same procedure as in Example 1 except that the cobalt bromide bistriethyl phosphine was replaced by cobalt chloride bistriethyl phosphine and cobalt iodide bistriethyl phosphine and polymerization time was extended to 3 hours. Table 3 below shows the results.

TABLE 3

| | CoX$_2$(Et$_3$P)$_2$ | Yield, g. | Microstructure, percent | | | $[\eta]$ |
|---|---|---|---|---|---|---|
| | | | Cis-1,4 | Vinyl | Trans-1,4 | |
| Example 5 | CoCl$_2$(Et$_3$P)$_2$ | 5.3 | 3 | 97 | 0 | 0.24 |
| Example 6 | CoI$_2$(Et$_3$P)$_2$ | 2.3 | 22 | 78 | 0 | 0.38 |

EXAMPLES 7 TO 10 AND CONTROLS 7 TO 9

Polymerization was carried out under the same conditions as in Example 1, except that the amount of water in the polymerization system was varied as shown in Table 4. Adjustment of the amount of water was performed by properly mixing hydrous methylene chloride and dry methylene chloride (containing 3.00 p.p.m. of water as measured by the Karl-Fischer's method). The results are shown in Table 4 below.

TABLE 4

| | H$_2$O/AlEt$_2$Cl molar ratio | Yield, g. | Microstructure, percent | | | $[\eta]$ |
|---|---|---|---|---|---|---|
| | | | Cis-1,4 | Vinyl | Trans-1,4 | |
| Example 7[1] | 0 | 4.2 | 1 | 99 | 0 | 0.18 |
| Example 8 | 0.25 | 4.2 | 5 | 94 | 1 | 1.71 |
| Example 9 | 0.50 | 3.7 | 1 | 97 | 2 | 2.31 |
| Example 10 | 0.75 | 4.0 | 4 | 95 | 1 | 1.53 |
| Control 7 | 1.00 | 3.2 | 60 | 32 | 8 | 1.08 |
| Control 8 | 1.50 | 2.7 | 49 | 13 | 38 | 1.34 |
| Control 9 | 2.00 | 1.5 | 8 | 20 | 72 | 0.13 |

[1] Example 7 was the same as Example 1 and the amount of water was about 3 p.p.m.

EXAMPLES 11 TO 13

Polymerization recipe

Methylene chloride—38 ml.
Butadiene—0.1 mol
AlEt$_2$Cl—2.0 millimols
Cobalt compounds—Varied
Triethyl phosphine—0.01 millimol
Polymerization temperature—10° C.
Polymerization time—2 hours The kinds of cobalt compounds were varied in accordance with the above polymerization recipe. The triethyl phosphine and cobalt compounds were separately added to the reaction system instead of using them as a complex compound. Thus butadiene was polymerized with the same procedure as in Example 1. The results are shown in Table 5 below.

TABLE 5

| Cobalt compounds | | | Microstructure, percent | | | |
|---|---|---|---|---|---|---|
| Kind | Amount, millimol | Yield, g. | Cis-1,4 | Vinyl | Trans-1,4 | [η] |
| Example 11 ... Cobalt trisacetyl-acetonate.... | 0.005 | 4.1 | 15 | 85 | 0 | 0.19 |
| Example 12 ... Cobalt ocetnoate................ | 0.005 | 4.4 | 12 | 88 | 0 | 0.20 |
| Example 13 ... Cobalt bromide................. | 0.0016 | 5.0 | 20 | 80 | 0 | 0.14 |

EXAMPLES 14–15

Polymerization recipe

Polymerization solvent—39 ml.
Butadiene—0.1 mol
AlEt$_2$Cl—2.0 millimol
CoBr$_2$(Et$_3$P)$_2$—0.005 millimol
Polymerization temperature—10° C.
Polymerization time—18 hours In accordance with the above receipe butadiene was polymerized with the same procedure as in Example 1 except varying the kind of the solvent as specified in Table 6 below. The results are shown in Table 6 below.

TABLE 6

| Polymerization solvent | Yield, g. | Microstructure, percent | | | [η] |
|---|---|---|---|---|---|
| | | Cis-1,4 | Vinyl | Trans-1,4 | |
| Example 14 ........... Chlorobenzene.... | 3.03 | 8 | 82 | 10 | 0.07 |
| Example 15 ........... Chloroform....... | 3.66 | 4 | 79 | 17 | 0.18 |

What is claimed is:

1. A method for preparing polybutadiene having up to 99% of vinyl configuration which comprises contacting butadiene in a halogenated hydrocarbon solvent with a catalyst prepared by mixing (I) a dialkyl aluminum chloride represented by the general formula AlR$_2$Cl (wherein R represents an alkyl group);
(II) a cobalt compound; and
(III) an organic phosphine represented by the general formula PR'R''R''' (wherein R' and R'' represent an alkyl group and R''' represents a member selected from the group consisting of alkyl groups and aryl groups)

in the presence of water in an amount less than the equimolar amount to the dialkyl aluminum chloride.

2. The method according to claim 1 wherein butadiene is contacted with the catalyst at a temperature of −30° to 100° C.

3. The method according to claim 1 wherein the amount of the catalyst employed is from 0.5 to 500 millimols based on the amount of the dialkyl aluminum chloride per one mol. of butadiene.

4. The method according to claim 1 wherein the halogenated hydrocarbon solvent is selected from the group consisting of methylene chloride and chlorobenzene.

5. A method for preparing polybutadiene having up to 99% of vinyl configuration which comprises contacting butadiene in a halogenated hydrocarbon solvent with a catalyst prepared by mixing (I) a dialkyl aluminum chloride represented by the general formula AlR$_2$Cl (wherein R represents an alkyl group);
(II) at least one cobalt compound selected from the group consisting of inorganic acid salts of cobalt, organic acid salts of cobalt and complex compounds of cobalt; and
(III) an organic phosphine represented by the general formula PR'R''R''' (wherein R' and R'' represent an alkyl group and R''' represents a member selected from the group consisting of alkyl groups and aryl groups)

in the presence of water in an amount less than the equimolar amount to the dialkyl aluminum chloride.

6. The method according to claim 5 wherein the dialkyl aluminum chloride is diethyl aluminum chloride.

7. The method according to claim 5 wherein the cobalt compound is selected from the group consisting of cobalt bromide, cobalt chloride, cobalt iodide, cobalt octenoate and cobalt trisacetylacetonate.

8. The method according to claim 5 wherein the phosphine is selected from the group consisting of triethyl phosphine and diethylphenyl phosphine.

9. A method for preparing polybutadiene having up to 99% of vinyl configuration which comprises contacting butadiene in a halogenated hydrocarbon solvent with a catalyst prepared by mixing (I) a dialkyl aluminum chloride represented by the general formula AlR$_2$Cl (wherein R represents an alkyl group); and
(II) a complex compound represented by the general formula CoX$_2$(PR'R''R''')$_2$ wherein X represents a halogen atom, R' and R'' represent an alkyl group and R''' represents a member selected from the group consisting of alkyl groups and aryl groups in the presence of water in an amount less than the equimolar amount to the dialkyl aluminum chloride.

10. The method according to claim 9 wherein the molar ratio of the complex compound to the dialkyl aluminum chloride ranges between 1/50 and 1/5000.

11. The method according to claim 9 wherein the complex compound is selected from the group consisting of cobalt bromide bistriethyl phosphine, cobalt chloride bistriethyl phosphine, cobalt iodine bistriethyl phosphine and cobalt bromide bisdiethylphenyl phosphine.

12. The method according to claim 1 wherein water is present in the polymerization system in an amount of 0.3 to 0.6 mol per one mol of the dialkyaluminum chloride.

13. The method according to claim 5 wherein water is present in the polymerization system in an amount of 0.3 to 0.6 mol per one mol of the dialkylaluminum chloride.

14. The method according to claim 9 wherein water is present in the polymerization system in an amount of 0.3 to 0.6 mol per one mol of the dialkylaluminum chloride.

References Cited

UNITED STATES PATENTS

| 3,067,188 | 12/1962 | Naylor | 260—94.3 |
| 3,116,273 | 12/1963 | Naylor et al. | 260—94.3 |
| 3,232,920 | 1/1966 | Naylor | 260—94.3 |
| 3,336,280 | 8/1967 | Naylor | 260—94.3 |

JOSEPH L. SCHOFER, Primary Examiner

R. A. GAITHER, Assistant Examiner